United States Patent [19]

Rohdin

[11] Patent Number: 4,506,182

[45] Date of Patent: Mar. 19, 1985

[54] TWO POLE RELUCTANCE MOTOR WITH NON UNIFORM POLE SHAPE FOR BETTER STARTING

[75] Inventor: Freddie L. Rohdin, Älvsjö, Sweden

[73] Assignee: Aktiebolaget Electrolux, Stockholm, Sweden

[21] Appl. No.: 533,243

[22] Filed: Sep. 19, 1983

[30] Foreign Application Priority Data

Oct. 1, 1982 [SE] Sweden .................................. 8205620

[51] Int. Cl.$^3$ .............................................. H01J 17/00
[52] U.S. Cl. .................................... 310/193; 310/187; 310/190; 310/254; 310/269
[58] Field of Search .................. 310/44, 190, 193, 163, 310/172, 187, 188, 41, 68 R, 254, 269

[56] References Cited

U.S. PATENT DOCUMENTS

| | | | |
|---|---|---|---|
| 2,240,652 | 5/1941 | Jenkins | 310/193 X |
| 3,189,771 | 6/1965 | Danek | 310/190 X |
| 3,296,472 | 1/1967 | Fisher | 310/187 X |
| 3,544,824 | 12/1970 | Kostrauskas et al. | 310/190 X |
| 4,004,168 | 1/1977 | Haydon | 310/41 |

Primary Examiner—Mark O. Budd
Attorney, Agent, or Firm—Alfred E. Miller

[57] ABSTRACT

A reluctance motor comprises a stator having two salient poles and a rotor also having two poles and being of soft magnetic material. The stator poles support windings which when current is being supplied generate a magnetic field which tends to set the rotor (16) in a stable position of equilibrium in which the rotor pole and the stator pole coincide. Either or both of the rotor poles and/or either or both of the stator poles are designed so as at high flux density to cause a constriction of the flux in a part of the cross section of the flux path to displace the position of equilibrium and when the flux density is moderate to distribute the flux generally uniformly over the said cross section.

5 Claims, 1 Drawing Figure

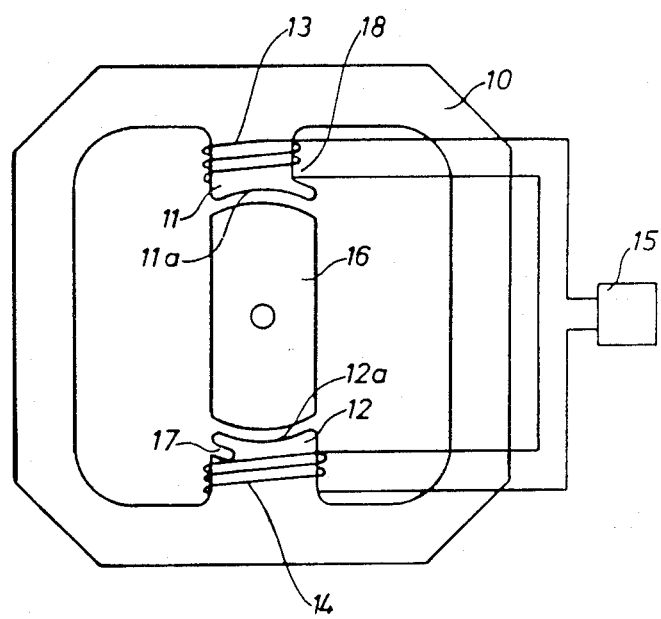

TWO POLE RELUCTANCE MOTOR WITH NON UNIFORM POLE SHAPE FOR BETTER STARTING

This invention relates to a reluctance motor and more in particular to a reluctance motor having means for insuring starting of the motor.

A two-pole reluctance motor has four rotor positions per revolution in which it cannot supply any torque. These rotor positions are magnetic equilibrium positions of which two are unstable and the other two are stable. If the rotor on start in in an unstable position of equilibrium there will normally be no problem for the rotor to start rotating. If, on the other hand, the rotor is in a stable position of equilibrium it cannot start without first having been moved out of the position of equilibrium.

The object of the invention is to provide a reluctance motor in which the rotor, in the event that it is in a stable magnetic position of equilibrium, during the starting process will automatically be moved out of this position so that the magnetic filed, which as conventional in reluctance motors is pulse-shaped, can cause the rotor to pendulate at increasing amplitude so that its movements will finally be transformed into a movement of rotation in the desired direction.

An embodiment of the invention will now be described by way of example with reference to the accompanying drawing which diagrammatically shows a cross section of a reluctance motor with a stator made according to the invention.

In the drawing a stator core 10 is shown which in usual manner is composed by stator laminations joined together for example by welds or rivets. The stator core has two poles 11, 12 with windings 13, 14. The latter are connected in series to a control device 15 designed so as to supply the windings with appropriate current pulses for driving the motor. A rotor 16 of soft magnetic laminated material is arranged to rotate in the air gap between the stator poles 11, 12. The cross section of the rotor is generally rectangular the short sides being slightly rounded to a form corresponding to the curvature of the pole surfaces 11a, 12a of the stator poles.

To allow starting of the rotor when in the shown position, i.e. the rotor poles are exactly opposite the stator poles, one or both stator poles can be made so that a part of the pole surface as seen in the direction of rotation of the rotor will have greater reluctance than the other part of the pole surface. Changing of the reluctance can be achieved in several ways, and the drawing shows two possible means, viz. in the form of a notch 17 in the stator pole 12 or a recess 18 in the pole 11. Notches 17 or alternatively recesses 18 can be made in either of the stator poles or in both. As an alternative, such recesses or notches can be provided in the rotor. The depth and location of the notch and the recess, respectively, should be such that the high current pulses appearing during the start will bring the pole portion situated above the notch or recess into saturation. The magnetic line of symmetry of the stator pole will thus be displaced relative to the physical line of symmetry of the pole, which causes the rotor, striving to adjust itself so as to be in the position in the flux path in which the reluctance is at its minimum, will be slightly turned out of the position shown. If the amplitude and duration of the current pulses are appropriately chosen the rotor will pendulate about the displaced position of equilibrium at an increasing amplitude so as to finally be caused into rotation. Tests have shown that rates of the magnitude of 1 Hz are suitable starting rates.

I claim:

1. In a reluctance motor comprised of a stator having two salient poles, a rotor of a soft magnetic material also having two poles, and a stator winding on each of said stator poles, the improvement wherein at least one of said stator and rotor poles is shaped to constrict flux therein to a portion of the cross section of the flux path, at high flux densities, thereby displacing the magnetic line of symmetry of the respective pole with respect to the physical line of symmetry of the pole, at high flux densities, with respect to the relative positions of the magnetic and physical lines of symmetry when moderate currents are applied to said windings.

2. The reluctance motor of claim 1 wherein said pole has a recess in one of its circumferential edges, whereby the portion of the pole adjacent said recess is saturated when high starting currents are applied to said windings.

3. A method for starting a reluctance motor having a stator with two salient poles, a rotor of soft magnetic material also having two poles, and stator windings on said stator poles, and wherein at least one of said poles has a recess in the circumferential direction, said method comprising applying a current of sufficient amplitude to said windings to cause saturation in the portion of the pole adjacent said recess, thereby to shift the magnetic line of symmetry of the pole with respect to the physical line of symmetry thereof, and then reducing the current applied to said windings to effect the distribution of the flux in said pole generally uniformly in its cross section.

4. The method of claim 3 wherein said step of applying high current to said windings comprises applying current pulses to said windings to cause said rotor to pendulate about its position of equilibrium.

5. In a reluctance motor comprised of a stator having two salient poles, a rotor of a soft magnetic material also having two poles, and a stator winding on each of said stator poles, the improvement wherein at least one of said poles has a recess in one of its circumferential edges for constricting flux in said pole to a portion of the cross section of the flux path at high flux densities, whereby the portion of said pole adjacent said recess is saturated when high starting currents are applied to said windings, thereby displacing the magnetic line of symmetry of the respective pole with respect to the physical line of symmetry of the pole at high flux densities, with respect to the relative positions of the magnetic and physical lines of symmetry when moderate currents are applied to said windings.

* * * * *